United States Patent
Walker et al.

[11] Patent Number: 6,125,178
[45] Date of Patent: *Sep. 26, 2000

[54] METHOD AND APPARATUS FOR ENABLING INTERACTION BETWEEN CALLERS WITH CALLS POSITIONED IN A QUEUE

[75] Inventors: Jay S. Walker, Ridgefield; James A. Jorasch, Stamford; Thomas M. Sparico, Riverside, all of Conn.

[73] Assignee: Walker Digital, LLC, Stamford, Conn.

[*] Notice: This patent is subject to a terminal disclaimer.

[21] Appl. No.: 09/401,471

[22] Filed: Sep. 22, 1999

Related U.S. Application Data

[63] Continuation of application No. 08/832,724, Apr. 11, 1997, Pat. No. 5,978,467.

[51] Int. Cl.⁷ .................................................. H04M 3/00
[52] U.S. Cl. ......................... 379/266; 379/202; 379/309
[58] Field of Search ..................................... 379/265, 266, 379/309, 67.1, 201, 202

[56] References Cited

U.S. PATENT DOCUMENTS

| | | |
|---|---|---|
| 4,788,715 | 11/1988 | Lee . |
| 5,020,095 | 5/1991 | Morganstein et al. . |
| 5,444,774 | 8/1995 | Friedes . |
| 5,483,588 | 1/1996 | Eaton . |
| 5,511,112 | 4/1996 | Szlam . |
| 5,515,421 | 5/1996 | Sikand et al. . |
| 5,528,670 | 6/1996 | Elliott et al. . |
| 5,561,707 | 10/1996 | Katz . |

*Primary Examiner*—Creighton Smith
*Attorney, Agent, or Firm*—Patrick J. Buckley

[57] ABSTRACT

The call handling system incorporating the invention is directed at: queuing a call when no agent is available to service the call; giving the caller an option to monitor (but not participate in) other caller conversations with similar queries, or to listen to recorded calls involving similar queries; querying a database using collected initial information as a search key(s) to retrieve a similar call currently being serviced or a recorded call; and connecting the caller to a communication channel to allow the monitoring of a call while not losing place in the queue for a next available agent. In a further embodiment of the invention, the caller is given a further option to enter a "chat room" where callers having like problems can converse until an agent becomes available.

32 Claims, 7 Drawing Sheets

| CALL TRACKING NUMBER | CALL SUBJECT CATEGORY | CALL POSITION | CALLER PHONE NUMBER (ANI) | CHANNEL NUMBER | TIME CALL WAS RECEIVED | AGENT TRACKING NUMBER | MONITORED AGENTS |
|---|---|---|---|---|---|---|---|
| 1234ABC | MONITOR | 45 OF 130 | 203 555 2222 | | 7:30 AM | 456GFHJ | 1A-1F |
| | | | | | | | |
| | | | | | | | |

FIG. 4

| AGENT IDENTIFICATION NUMBER | AGENT STATUS | AGENT AREA OF EXPERTISE |
|---|---|---|
| 1A | OCCUPIED | MONITORS AND PRINTERS |
| | | |
| | | |

FIG. 5

| CALL SUBJECT CATEGORY | DATE OF RECORDED CALL | LENGTH OF RECORDED CALL | RECORDED CALL DATA |
|---|---|---|---|
| MONITORS | DECEMBER 22, 1996 | 32:21.3 | |
| | | | |
| | | | |

FIG. 6

METHOD AND APPARATUS FOR ENABLING INTERACTION BETWEEN CALLERS WITH CALLS POSITIONED IN A QUEUE

The present application is a continuation of U.S. patent application Ser. No. 08/832,724 filed on Apr. 11, 1997 and issued as U.S. Pat. No. 5,978,467.

FIELD OF THE INVENTION

The present invention relates to communication switching systems and, more specifically, to a queuing system for calls directed to a call center, wherein a caller can monitor other calls while awaiting an agent's response.

BACKGROUND OF THE INVENTION

For a growing number of public and private organizations, telephone-based customer support plays an increasingly vital role in activities requiring direct communication with a caller/customer. In order to serve a maximum number of callers, every call center is designed to optimize call handling efficiency and telephone agent productivity. Some prior art systems allow telephone agents to service a greater number of callers by a) ascertaining a caller's request through collection, by a live agent, of initial information from the caller, and b) transferring the call to a voice response unit to address the specific request of the caller. Other systems reverse the answer and collection process by connecting the caller initially to a voice response unit which collects information that is ultimately used to route the call to an appropriate agent.

While these techniques increase agent productivity, such systems are often limited to business transactions that are rather simple and clearly defined. For moderately complex applications, in which caller requests differ significantly from one caller to the next, semi-automated prior art systems may lead to disconnects, connection to a wrong agent pool, or a sequence of call transfers that may be disconcerting to some callers.

A common device used in telemarketing centers to enhance agent productivity is an Automatic Call Distributor (ACD) which allows a call center to cost-effectively handle a large number of calls by placing calls in a holding queue when no agents are available. Before a call is placed in the holding queue, a greeting message identifying the called party is played by the ACD, via an interactive voice response unit (IVRU), to the caller, indicating that the next available agent will service the call. During the holding period, music or advertising messages may be played to the caller to entertain or inform the caller of sales promotions for particular products or services.

Call queuing plays a very important role in call center operations. Known advantages to the call center include increased agent productivity by reduction of idle time for the agent, and increased capacity to handle more calls simultaneously during peak calling periods. Long call queues, however, have several disadvantages. Call centers waste a tremendous amount of money servicing long call queues. Callers waste time while in the queue, resulting in dissatisfaction with the service provided, potentially leading to abandoned calls. Further, for non 800 number calls, the user pays telecommunication charges while waiting.

It is known that many callers to call centers have identical or nearly identical queries but still obtain individual handling by agents. The prior art has attempted to handle such queries by providing pre-recorded answers to commonly asked questions. However, such a facility can provide less than satisfactory customer service, especially when the recorded answer does not precisely match the customer's query.

SUMMARY OF THE INVENTION

It is an object of the invention to provide a call queuing system which enables a caller to obtain information in response to a query, prior to an agent being able to answer the call.

It is another object of the invention to provide a call queuing system which enables a caller whose call has been placed in a queue to "listen in" on other calls-wherein discussions are being held that relate to the caller's query.

It is a further object of the invention to provide a call queuing system which allows a caller, whose call is on hold, to browse through an archive of recorded calls or to listen to an on-going call so as to enable the caller's question to be possibly answered, without requiring connection to a live agent.

The present invention is directed to: queuing a call when no agent is available to service the call, giving the caller an option to monitor (but not participate in) other caller conversations with similar queries, querying a database using collected initial information as a search key(s) to retrieve additional information needed to find a similar caller currently being serviced, and connecting the caller to a communication channel to allow the monitoring of a call while not losing place in the queue for a next available agent.

The invention takes advantage of the features and functionality offered by premise-based ACDs. In an exemplary embodiment of the invention, an ACD at the call center determines that no agents are available to handle an incoming call and invites the caller to be placed in an interactive holding queue. Upon receiving a signal indicating the caller's willingness to be placed in the queue, announcements are then played to the caller in order to collect initial information to direct the call. The collected information enables the system to search for a similar subject already being handled by an agent. If such a call is on-going, the call is forwarded to a switch serving the agent. The switch, in turn, allows the caller to monitor the call in progress or a previous call which has been recorded. A database retains the caller's subject and queue status until an agent becomes available. When an agent becomes available the switch disconnects the monitor-only connection of the caller and forwards the call to the available agent.

In another embodiment of the invention, the caller is given an option to remain in the monitor-only status until the monitored call is completed and then to return to the top of the queue for the next available agent.

In a further embodiment of the invention, the caller is given the option to enter a "chat room" where callers having similar problems can converse until an agent becomes available.

The present invention has the advantage of reducing the size of a call queue, thereby increasing customer satisfaction while directly decreasing the costs of the provider.

BRIEF DESCRIPTION OF THE DRAWINGS

FIG. 4 is a schematic drawing of the contents of a call database used in the invention.

FIG. 5 is a schematic drawing showing an agent database used with the invention.

FIG. 6 is a schematic diagram of a recorded call archives database used with the invention.

DETAILED DESCRIPTION OF THE INVENTION

Figure 1:
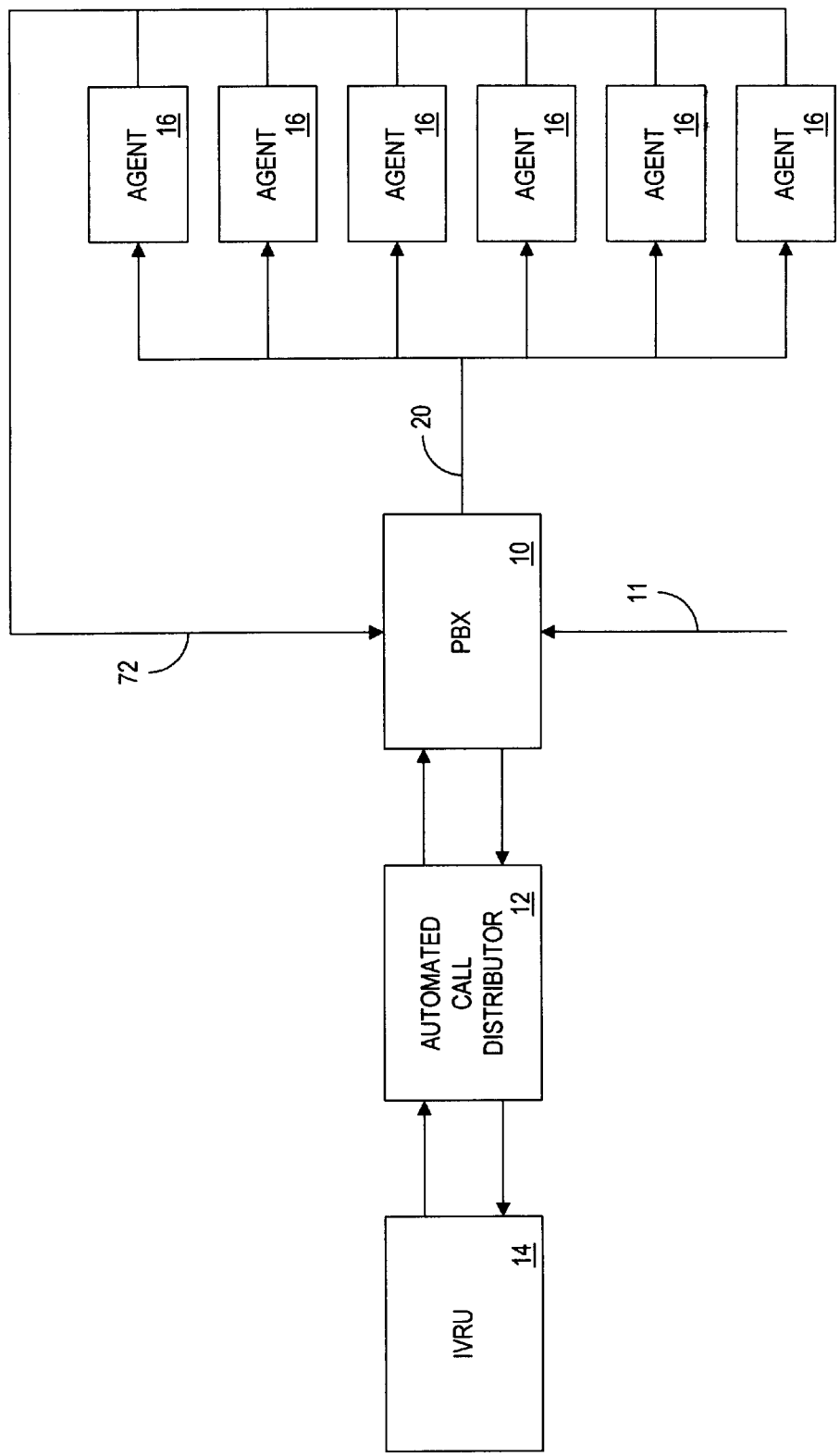
FIG. 1 is a block diagram of a caller-interactive phone queuing system that incorporates the invention.

Referring to FIG. 1, a priority phone queuing system incorporating the invention includes a Private Branch Exchange (PBX) 10, an ACD 12 and an IVRU 14. PBX 10 receives incoming calls via trunk 11 and is, via trunk 20, connected to a plurality of agent terminals 16. PBX 10 further provides caller data to ACD 12 which handles queuing management of the calls and further controls the operation of IVRU 14. IVRU 14 communicates with the callers by passing/receiving audio signals through ACD 12 to/from PBX 10 and the connected calling party whose call has been placed on hold. Those skilled in the art will understand that the precise arrangement of PBX 10, ACD 12 and IVRU 14 shown in FIG. 1 is merely illustrative, and that other arrangements thereof can accomplish the invention to be described below.

In the description which follows, it will be assumed that all agent terminals 16 are busy and that PBX 10 cannot respond to an incoming call by making a direct connection to an agent. As a result, PBX 10 is forced to place an incoming call on hold and to provide data regarding the call to ACD 12. In response, ACD 12 places the incoming call in a queue, in the order received. Thereafter, when PBX 10 determines that an agent terminal is available, it so instructs ACD 12, which removes the call at the top of the queue and provides it to PBX 10, which then takes the corresponding incoming line off hold and connects the caller to the available agent terminal 16.

Once ACD 12 has placed the incoming call in a queue, it transmits a message to IVRU 14 which, in turn, plays a message for the caller whose call has been placed on hold. That message provides the caller with the option to "listen-in" on other customer service calls that are already in progress and that are directly related to the subject matter of the caller's query. Should the caller accept the offer, IVRU 14 notifies ACD 12 of the acceptance. ACD 12 then instructs PBX 10 to re-route the call to enable the caller to listen to an agent/caller discussing a subject that is common to the incoming caller's query.

ACD 12 can also be programmed to allow the caller whose call has been placed on hold to selectively "sample" available calls in progress or previously recorded customer service calls. The previously recorded calls are stored in data storage in PBX 10 in a "recorded call archive". Allowing the caller whose call is on hold to selectively browse through the archive or to listen to an on-going call may result in the caller's question being answered, without requiring connection to a live agent. The incoming caller, while on hold, is enabled to access and listen to any archived call in the same subject category as his call, and/or to listen to the different on-going calls to see if any one addresses the particular problem he has called about.

ACD 12 can further be programmed to allow the caller whose call has been placed on hold to participate in a "chat room" with other customers whose calls are also in the queue. A chat room is a line on which multiple people can talk simultaneously, enabling the customers to exchange advice regarding the problems they are experiencing. This exchange offers the possibility of obtaining a solution/answer to the caller's problem without requiring connection to a live agent.

Enabling an incoming caller whose call has been placed on hold in a queue to either "listen-in" on a live call-in-progress, to access and search through pre-recorded calls in the same subject area or to participate in a chat room, provides many benefits. Among these benefits are a reduction in calls that will require live operator assistance, an increase in customer satisfaction, and an decreased hold time for each caller.

Figure 2:
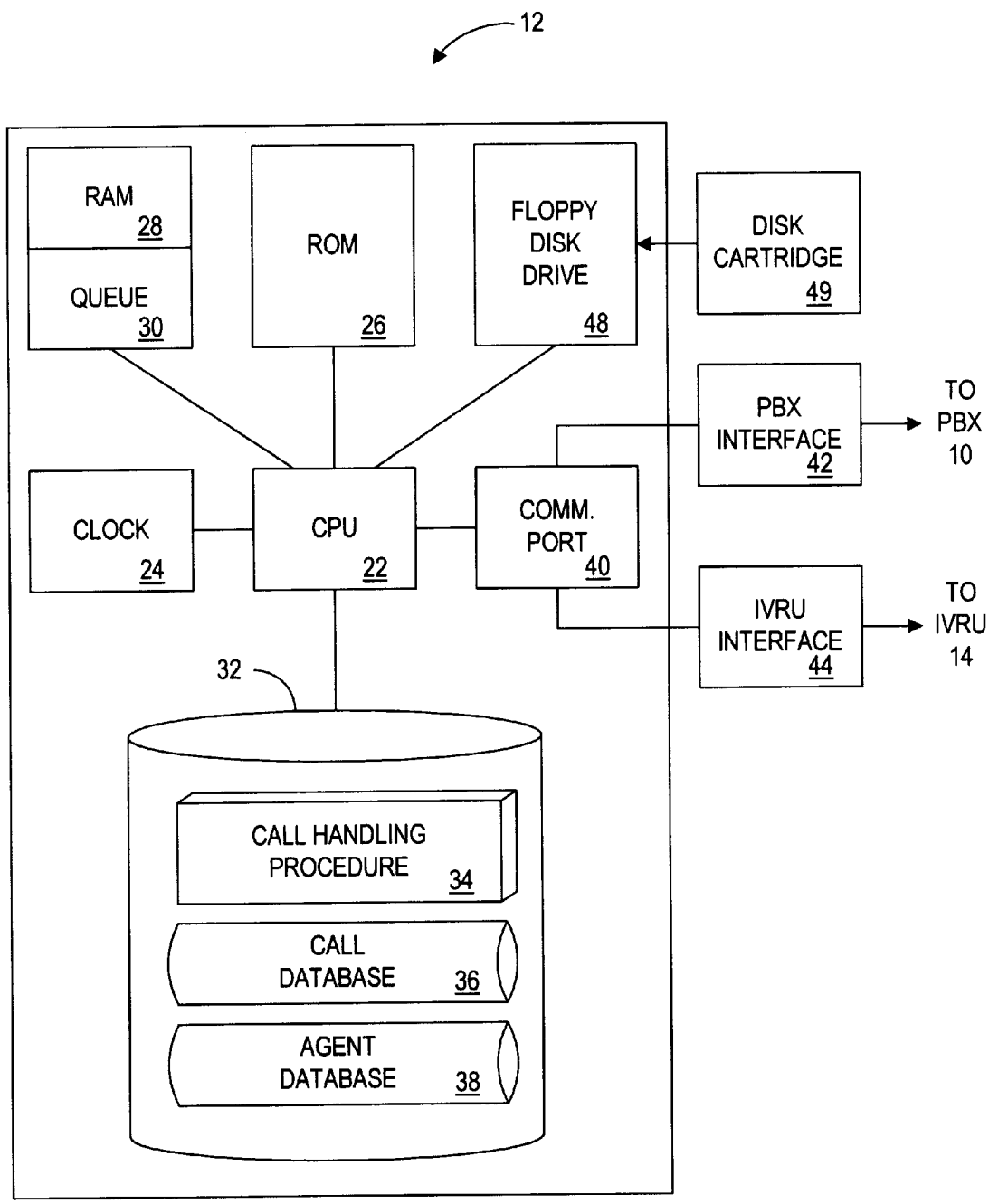
FIG. 2 is a block diagram of an automated call distributor (ACD) used with the invention.

Further details of the components of the system of FIG. 1 will now be described to enable a more complete understanding of the invention. Referring now to FIG. 2, ACD 12 is controlled by a central processing unit (CPU) 22 and includes a clock 24, a read-only memory (ROM) 26 and a random access memory (RAM) 28. RAM 28 includes one or more call queue(s) 30 of call identifier indicating calls awaiting connection to an agent terminal 16.

A data storage device 32 (e.g., a disk drive) includes a call handling procedure 34 that enables handling of queue(s) 30 and other functions performed by ACD 12, to be hereafter described. Data storage device 32 further includes a call database 36 and an agent database 38, all of which will be hereafter described in conjunction with the schematic illustrations in FIGS. 4 and 5.

ACD 12 communicates with PBX 10 via communications port 40 and PBX interface 42; and with IVRU 14, via IVRU interface 44. Also connected via communication port 40 is a floppy disk drive 48 which is adapted to receive a disk cartridge 49. It is to be understood that call handling procedure 34 can be off-loaded from disk cartridge 49 and thereafter utilized to control the operation of ACD 12.

Call database 36 maintains information regarding incoming calls. Agent database 38 provides further information regarding each agent terminal 16 and provides signals to PBX 10 which instruct as to the routing of control signals and telephone calls to individual agent terminals 16.

Figure 3:
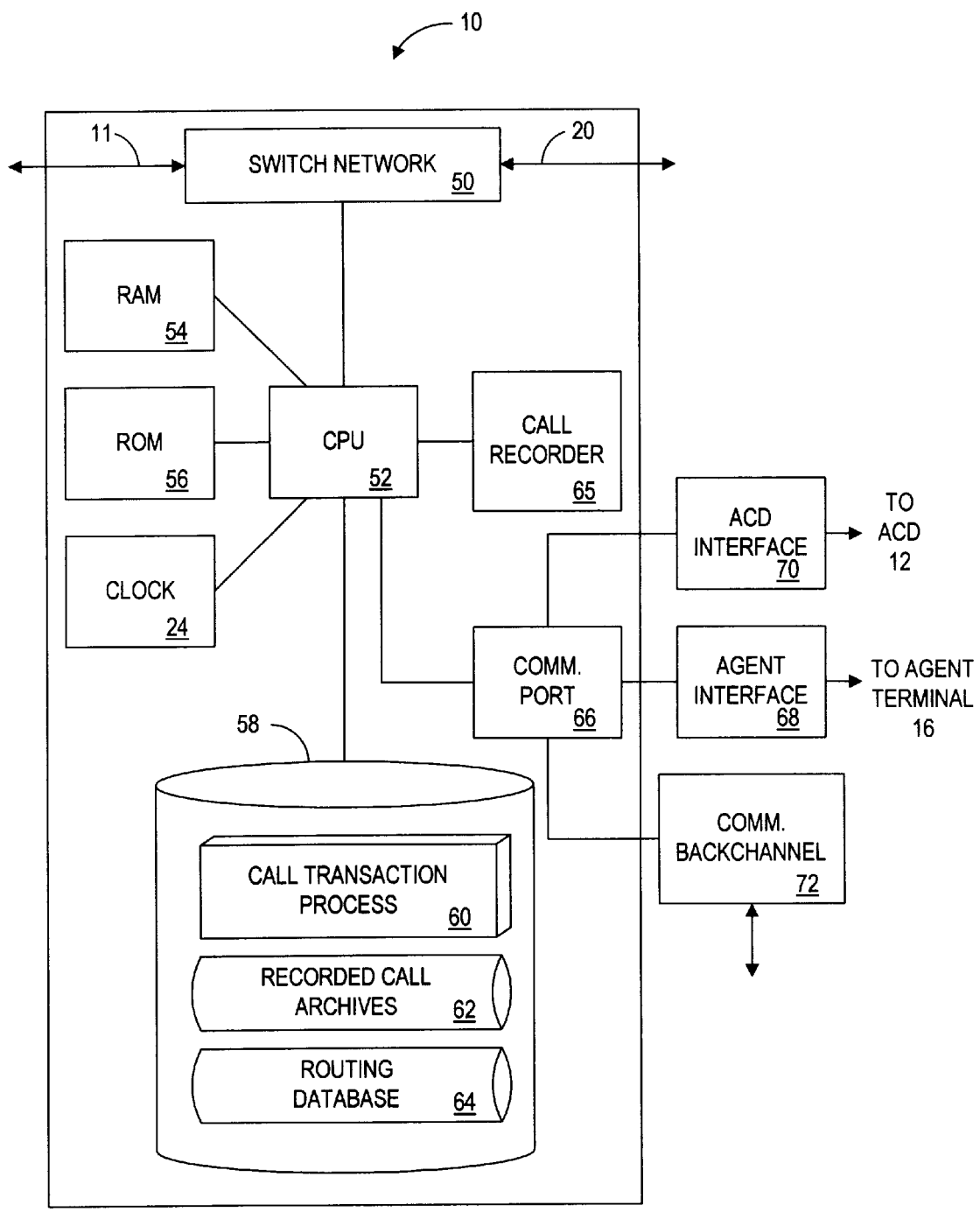
FIG. 3 is a block diagram of a private branch exchange (PBX) used with the invention.

Turning now to FIG. 3, PBX 10 comprises a switch network 50 which receives incoming calls via trunk 11 and provides outgoing connections to agent terminals 16 (FIG. 1) via trunk 20. Control of switch network 50 is exerted by central processing unit (CPU) 52 which is, in turn, controlled by procedures stored in RAM 54 and ROM 56.

Control procedures and databases used by CPU 52 are held in data storage device 58. Stored therein is a call transaction process 60, a recorded call archive database 62 and a routing database 64. Call transaction process 60 enables CPU 52 to react to an incoming call; to place the call on hold if all agents are busy; to connect the call to an available agent; and to communicate with ACD 12 so as to enable the caller to monitor calls in progress, to "browse" through recorded call archives 62 or to participate in a chat room. A call recorder 65 enables recording of calls and may be addressed by CPU 52, responsive to data in recorded call archive 62, to play previously recorded calls for caller listening.

Recorded call archive 62 holds recordings of prior calls with agents. These calls are classified by subject matter to enable an accessing thereof by an associative search process. Routing database 64 maintains route information to connected agent terminals 16 (and any other terminals that are connected to PBX 10).

PBX 10 controls communications with each of agent terminals 16, via a communication port 66 and an agent interface 68. Control signals are sent to agent terminals 16 via control wiring (not shown) between PBX 10 and each of agent terminals 16. The control signals may, alternatively, be carried over the internal telephone network comprising trunk 20. ACD interface 70 enables PBX 10 to communicate with ACD 12 (see FIG. 2).

Referring also to FIG. 1, each agent terminal 16 includes a communication "back" channel connection 72 which enables an agent at an agent terminal 16 to provide a call subject classification back to PBX 10. More specifically, when an agent has initially conversed with a caller and determined the subject of the caller's query, the agent transmits a subject category value to PBX 10, via back channel 72. PBX 10 feeds the call subject category value to ACD 12 for storage in a call database in association with the call.

It is to be understood that PBX 10, ACD 12 and IVRU 14 are all commercially available units. For instance, the Ameritech Corporation's Call Center provides all of the functions including automatic call agent functions, automatic call distribution/switching functions and interactive voice response functions.

Turning now to FIGS. 4–6, three databases are schematically illustrated which aid in the implementation of the invention. Call database 36 (FIG.4) includes a listing of call tracking numbers which are assigned to calls as each call is received; a call subject category which identifies a subject classification of a caller's inquiry; a call position value which indicates the call's queue position; the caller's phone number; a channel number which identifies the internal telephone line to which the call has been assigned (for connection to an agent); the time the call was received; an agent tracking number; and an archive call number which indicates an archived call (if any) to which the caller has been connected.

FIG. 5 illustrates the contents of agent database 38. The agent identification number is self-explanatory. The agent status indicates whether the agent is busy or available. The agent area of expertise entry defines a particular subject matter (or subject matters) which the agent is competent to handle. The latter category enables ACD 12 to connect an incoming call (where the subject of the call has been pre-identified by the caller), to an agent having expertise in the call's subject matter.

FIG. 6 illustrates recorded call archive database 62 which includes four fields, i.e., a call subject category which defines the subject matter of a call recorded in the archive database; the date the call was recorded; the length of the recorded call; and the recorded call data. Each field enables ACD 12, in conjunction with call handling procedure 34, to manage the connection of an archived call to a caller waiting in a queue. The subject matter and date of the recorded call are used to access the recording within archive database 62.

It is to be understood that the above-described databases are intended to illustrate one embodiment of the present invention. Many alternative database structures will be apparent to those skilled in the art.

Figure 7:
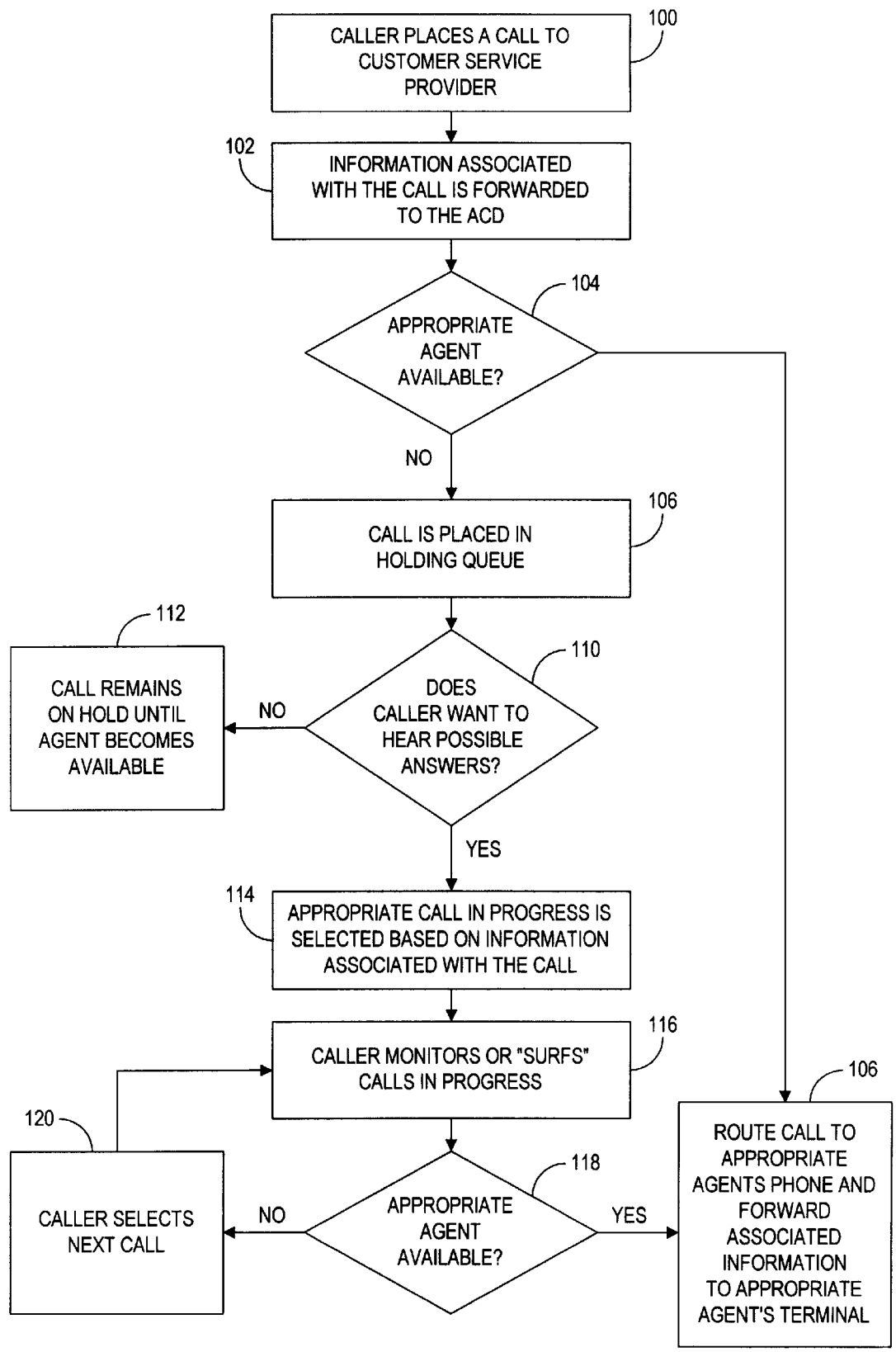
FIG. 7 is flow chart describing the method by which calls are processed and routed in accordance with the invention.

Referring to the flow diagram of FIG. 7, the procedure employed by the invention will be described. Initially, a caller places a call to a customer service provider (box 100). The incoming caller's telephone number is detected by an automatic number identification (ANI) facility. In response to voice prompts from IVRU 14, and in conjunction with control commands from ACD 12, PBX 10 then inputs information regarding the call to ACD 12 (box 102). One such piece of information may be the subject matter of the call. For instance, IVRU 14 may provide a series of subjects to the caller, and ask the caller to respond by depressing a specified key to identify a particular subject (e.g. "press 1 for printer problems, press 2 for modem problems").

Once the call information has been entered by ACD 12 into call database 36, the system determines whether an appropriate agent is available (decision box 104). If so, the call is routed to the agent's phone and the information associated with the call is transmitted to the agent's terminal (box 106). If no agent is available, the call is placed in the holding queue (box 108). IVRU 14 plays a message asking whether the caller would like to monitor an on-going call, an archived call or participate in a "chat room" (decision box 110). If the caller declines to hear more information, the call remains on hold in the holding queue (box 112) to await availability of an appropriate agent (decision box 118).

If the caller agrees to hear additional information (decision box 110), an appropriate call in-progress, archived call or chat room is selected, as the case may be, based on the subject of the incoming call and the preferences of the caller (box 114). For instance, each call in progress with an agent has already had a subject matter categorization entered into call database 36. Accordingly, by matching the incoming call subject with ongoing call subject categories in call database 36, an appropriate call in progress can be selected for connection to the incoming caller's line. It is to be noted, however, that the connection of the incoming caller's line only allows a monitoring of the call in progress call. It should be noted that the initial caller who is currently talking to a live operator is provided the option of maintaining a private call. Should the caller not want another party to "listen in", he can simply designate so at the onset of the connection with the live operator. Call centers may provide callers with some incentive to allow other callers to "listen in". For example, a caller might receive a discount towards a future purchase for allowing an open line. In addition, all operators will be given the ability to mute or lock out any listeners. When caller sensitive material or information is going to provide a credit card account number or software license number, the operator might simply press a button, securing the phone line such that no one can hear that sensitive information. Similar actions occur with respect to archived calls and chat room(s), depending on the incoming caller's choice. For instance, if the caller elects to listen to an archived call, call handling procedure 34 selects an appropriate recorded call from the archive and plays the call for the incoming caller.

Should the caller determine that a call selection made by call handling procedure 34 is not of interest, or involves a subject that does not match the caller's subject, the caller is enabled (box 116) to monitor or "browse" other calls in progress or other archived calls. This browsing is enabled through the entry (by the caller) and detection (by IVRU 14) of appropriate tones to restart the call selection process described above. Only when an appropriate agent becomes available (box 118) does the procedure terminate, to enable the incoming call to be routed to the agent (box 106).

If an appropriate agent is still not available when a monitored call ends, and further calls are available to be monitored, the system then enables the caller to select another call (box 120). This action continues until an agent becomes available or the caller determines that his/her query has been answered by the aforesaid call listening/chat room actions.

The provision of the above-noted listening/chat room features enables a caller whose call has been placed in a queue to possibly find an answer to a query in advance of being connected to an agent. As a result, a number of incoming calls will disconnect before being connected to an agent, thereby enabling an improvement in service to other callers still on hold. Further, since the call queue moves faster, the call center stands to gain as a result of shorter call times leading to lower telecommunication costs.

A system embodying the invention can include further features, which will enable the system to exhibit additional options for call center operations. For example, a caller might be given the option of not making his call available for monitoring by other callers; the caller might be billed less for a call that is made available for monitoring; if a live call is chosen to be monitored, the listening-in caller might lose his position in the call queue, to be positioned at the end of the queue when he quits the call monitoring function. Further, a charge may be levied for the monitoring/listening-in option.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of processing a telephone call from a first caller to a call center, the telephone call from the first caller being placed in a telephone call queue, comprising:

offering the first caller an option to participate in a conversation involving a second caller, the second caller having also placed a telephone call to the call center; and arranging for the first caller to participate in the conversation involving the second caller.

2. The method of claim 1, wherein the first caller participates in the conversation by listening to the conversation.

3. The method of claim 1, wherein the conversation comprises an in-progress call between the second caller and an agent associated with the call center.

4. The method of claim 1, wherein the conversation comprises a recorded call between the second caller and an agent associated with the call center.

5. The method of claim 1, wherein the conversation comprises a conversation between the first caller and the second caller.

6. The method of claim 1, further comprising:

determining a subject associated with the telephone call from the first caller, wherein said arranging comprises arranging for the first caller to participate in a conversation associated with the subject.

7. The method of claim 6, wherein said determination is performed by at least one of: (i) an agent associated with the call center; (ii) a voice response unit; and (iii) an interactive voice response unit.

8. The method of claim 1, further comprising:

when an agent associated with the call center becomes available, arranging for the first caller to be connected to the agent.

9. A call center device for processing a telephone call from a first caller to a call center, the telephone call from the first caller being placed in a telephone call queue, comprising:

a processor; and a storage device coupled to said processor and storing instructions adapted to be executed by said processor to:

offer the first caller an option to participate in a conversation involving a second caller, the second caller having also placed a telephone call to the call center; and arrange for the first caller to participate in the conversation involving the second caller.

10. The call center device of claim 9, wherein the first caller participates in the conversation by listening to the conversation.

11. The call center device of claim 9, wherein the conversation comprises an in-progress call between the second caller and an agent associated with the call center.

12. The call center device of claim 9, wherein the conversation comprises a recorded call between the second caller and an agent associated with the call center.

13. The call center device of claim 9, wherein the conversation comprises a conversation between the first caller and t he second caller.

14. The call center device of claim 9, wherein said storage device further stores instructions adapted to be executed by said processor to:

determine a subject associated with the telephone call from the first caller, wherein said processor arranges for the first caller to participate in a conversation associated with the subject.

15. The call center device of claim 14, wherein the determination is performed by at least one of: (i) an agent associated with the call center; (ii) a voice response unit; and (iii) an interactive voice response unit.

16. The call center device of claim 9, wherein said storage device further stores instructions adapted to be executed by said processor to:

when an agent associated with the call center becomes available, arrange for the first caller to be connected to the agent.

17. The call center device of claim 9, wherein said storage device further stores a call database.

18. The call center device of claim 9, wherein said storage device further stores an agent database.

19. The call center device of claim 9, wherein said storage device further stores a recorded call archives database.

20. The call center device of claim 9, wherein said storage device further stores a routing database.

21. A medium storing instructions adapted to be executed by a processor to perform a method of processing a telephone call from a first caller to a call center, the telephone call from the first caller being placed in a telephone call queue, said method comprising:

offering the first caller an option to participate in a conversation involving a second caller, the second caller having also placed a telephone call to the call center; and arranging for the first caller to participate in the conversation involving the second caller.

22. The medium of claim 21, wherein the first caller participates in the conversation by listening to the conversation.

23. The medium of claim 21, wherein the conversation comprises an in-progress call between the second caller and an agent associated with the call center.

24. The medium of claim 21, wherein the conversation comprises a recorded call between the second caller and an agent associated with the call center.

25. The medium of claim 21, wherein the conversation comprises a conversation between the first caller and the second caller.

26. The medium of claim 21, said method further comprising:
   determining a subject associated with the telephone call from the first caller,
   wherein said arranging comprises arranging for the first caller to participate in a conversation associated with the subject.

27. The medium of claim 26, wherein said determination is performed by at least one of: (i) an agent associated with the call center; (ii) a voice response unit; and (iii) an interactive voice response unit.

28. The medium of claim 21, said method further comprising:
   when an agent associated with the call center becomes available, arranging for the first caller to be connected to the agent.

29. A computer-readable medium that stores data accessible by a program executable on a data processing system, the data being organized according to a data structure that includes:
   a first caller data object representing a first caller who placed a telephone call to a call center, the telephone call being placed in a telephone call queue; and
   a conversation data object representing a conversation involving a second caller,
   wherein an option to participate in the conversation is offered to the first caller and an arrangement is made for the first caller to participate in the conversation.

30. A call center system for processing a telephone call from a first caller to a call center, the telephone call from the first caller being placed in a telephone call queue, comprising:
   means for offering the first caller an option to participate in a conversation involving a second caller, the second caller having also placed a telephone call to the call center; and
   means for arranging for the first caller to participate in the conversation involving the second caller.

31. A method of processing a telephone call from a first caller to a call center, the telephone call from the first caller being placed in a telephone call queue, comprising:
   a step for offering the first caller an option to participate in a conversation involving a second caller, the second caller having also placed a telephone call to the call center; and
   a step for arranging for the first caller to participate in the conversation involving the second caller.

32. A method of processing a telephone call from a first caller to a call center, the telephone call from the first caller being placed in a telephone call queue, comprising:
   offering the first caller an option to participate in a conversation involving a second caller;
   receiving an identifier from the first caller;
   selecting, based on the received identifier, a conversation involving a second caller;
   arranging for the first caller to participate in the selected conversation;
   receiving an indication from the first caller of a desire to participate in a different conversation; and
   arranging for the first caller to participate in the different conversation.

* * * * *